US009747574B2

(12) United States Patent
Belhaj Amor et al.

(10) Patent No.: US 9,747,574 B2
(45) Date of Patent: Aug. 29, 2017

(54) PROJECT ASSESSMENT TOOL

(71) Applicants: Beyram Belhaj Amor, Beni-Khiar (TN); Hichem Njeh, Tunis (TN); Wided Smati, Beja (TN)

(72) Inventors: Beyram Belhaj Amor, Beni-Khiar (TN); Hichem Njeh, Tunis (TN); Wided Smati, Beja (TN)

(*) Notice: Subject to any disclaimer, the term of this patent is extended or adjusted under 35 U.S.C. 154(b) by 0 days.

(21) Appl. No.: 14/873,444

(22) Filed: Oct. 2, 2015

(65) Prior Publication Data
US 2017/0098178 A1    Apr. 6, 2017

(51) Int. Cl.
*G06F 9/44*     (2006.01)
*G06Q 10/06*    (2012.01)
*G06Q 30/02*    (2012.01)
*G06Q 10/10*    (2012.01)

(52) U.S. Cl.
CPC ............ *G06Q 10/067* (2013.01); *G06F 8/20* (2013.01); *G06F 8/70* (2013.01); *G06Q 10/103* (2013.01); *G06Q 30/0206* (2013.01)

(58) Field of Classification Search
CPC ................................ G06F 8/20; G06Q 10/103
USPC ......................................... 717/103; 705/301
See application file for complete search history.

(56) References Cited

U.S. PATENT DOCUMENTS

| 2004/0083157 | A1* | 4/2004 | Sasser ............. G06Q 40/04 705/37 |
| 2004/0143477 | A1* | 7/2004 | Wolff ........... G06Q 10/06316 705/7.26 |
| 2005/0086096 | A1* | 4/2005 | Bryant ............. G06Q 10/0635 705/315 |
| 2006/0173762 | A1* | 8/2006 | Clater ............... G06Q 10/06 705/35 |
| 2009/0070188 | A1* | 3/2009 | Scott ................ G06Q 40/08 705/7.28 |
| 2009/0119141 | A1* | 5/2009 | McCalmont ...... G06Q 10/0637 705/7.41 |
| 2009/0216628 | A1* | 8/2009 | Pandey ............. G06Q 10/06 705/7.39 |

(Continued)

OTHER PUBLICATIONS

Yu et al., ""The HowTo Guide to a More Efficient Home": Project Report", 2016.*

(Continued)

*Primary Examiner* — Phillip H Nguyen
(74) *Attorney, Agent, or Firm* — Buchanan Ingersoll & Rooney PC

(57) ABSTRACT

An assessment tool for projects can include a computer system having at least one computer device to gather information about projects, generate project assessments, and display information about project assessments. A client-questionnaire module through which questions may be populated pertaining to a project can be used to gather data. Data used to generate a project assessment may be a compilation of coalesced data acquisitioned from a library of historical projects stored in a database of the system. Questions can be assigned and/or grouped based on a relevance-indicator and answers to questions can be assigned an importance-indicator. The coalesced data can be formed by assigning weight-factors to project parameters and analyzing the data to generate statistical expectation values for project parameters of a client's project.

20 Claims, 15 Drawing Sheets

(56) References Cited

U.S. PATENT DOCUMENTS

| | | | | |
|---|---|---|---|---|
| 2012/0110087 | A1* | 5/2012 | Culver | G06F 17/5004 |
| | | | | 709/205 |
| 2013/0304618 | A1* | 11/2013 | Mastrogiovanni | G06T 11/60 |
| | | | | 705/35 |
| 2014/0222608 | A1* | 8/2014 | Cohen | G06Q 50/165 |
| | | | | 705/26.4 |

OTHER PUBLICATIONS

Flyvbjerg et al., "Cost Underestimation in Public Works Projects: Error or Lie?", 2002.*

* cited by examiner

PROJECT ASSESSMENT TOOL

BACKGROUND OF THE INVENTION

Field of the Invention

Embodiments disclosed herein relate to systems and methods for assessing projects, such as webpage development projects, information technology projects, construction projects, painting projects, and other projects. In particular, disclosed is an assessment tool for generating project assessments to assist client-users with determining the scope and costs associated with a website development/mobile application development project.

Background of the Related Art

Engaging in projects, such as construction projects, webpage development projects, painting projects, etc., can be a time-consuming and complicated task. For example, with a webpage development project many variables may have to be considered, not to mention one generally has to keep up with current technological advancements in order to properly develop webpages and/or provided services for such development. As an alternative, those who want a webpage developed can commission the work from service providers and other contractors. Yet, there can be many facets to webpage development, and each service provider may exhibit expertise in one area but not in another. Another factor adding to the complexity is that many who desire to have a webpage developed typically need to employ the services of webpage development providers infrequently, which keeps them out-of-touch with costs, products/services available, and knowledge of the service providers' competencies.

BRIEF SUMMARY OF THE INVENTION

An assessment tool can include a computer system having at least one computer device to gather information about projects, generate project assessments, and display information about the project assessments. Methods for applying the assessment tool can include generating a client-questionnaire module through which questions may be populated pertaining to a project (e.g., webpage development project, information technology project, or other project) that a client-user wants to generate a project assessment for. Answers to the questions can be used to generate the project assessment. The project assessment can include data entered in the form of answers and/or data acquisitioned from a library of historical-project data.

Data used to generate the project assessment may be a compilation of coalesced data acquisitioned from the library of historical-projects and the data entered via the questionnaires. Generating the coalesced data can include assigning questions and/or grouping questions based on a relevance-indicator to facilitate tagging a plurality of historical-projects from the database that are similar to the project the client-user is attempting to obtain a project assessment for. In addition, answers to questions can be assigned an importance-indicator to determine the impact the answer has on a project parameter (e.g., cost). The coalesced data can be formed by assigning weight-factors to project parameters and analyzing the data to generate statistical expectation values for certain parameters of the client's project. For instance, a project assessment may include a statistical average of the historical costs associated with a particular type of project. The compilation of project assessment data can also be used to generate a model project, which can be representative of the scope of the project that the client-user wants a project assessment for.

Model project data and project assessment data can be displayed via a project assessment module to provide a client-user with distilled information about the scope, costs, and other relevant factors about the client's project. This information can be displayed textually and/or graphically, and may be generated in real time.

Some embodiments can include a contractor-questionnaire module through which contractors (e.g., painters, appliance repairer, service providers, vendors, etc.) can enter data to be stored in the database as part of the historical project data. Further embodiments may include a contractor panel programmed to be displayed via the project assessment module, which can provide recommended contractors to a client-user based on the model project and project assessment data of a particular project. An expertise-indicator can be assigned to a contractor profile stored within the system, which may be indicative of the expertise of the contractor in a certain field of work when displaying and ranking recommended contractors via the contractor panel.

While exemplary embodiments may describe the system and method being applied to a webpage development project, it is understood that the disclosed system and method can be used for any project that a user wants to perform a project assessment for. For example, the assessment tool can be used to generate a project assessment for a construction project, an appliance repair project, etc. Any project where the scope of the services can be modeled using a list of questions and answers may be a project applicable for use with the assessment tool.

While these potential advantages are made possible by technical solutions offered herein, they are not required to be achieved. Embodiments of the presently disclosed system and method can be implemented to achieve technical advantages, whether or not these potential advantages, individually or in combination, are sought or achieved.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

The assessment tool can include a computer system 100 programmed to generate at least one questionnaire module displayed on a display unit of at least one computer device. Data (in the form of answers to questions) entered via a questionnaire module 200 can be transmitted to the computer system 100 for processing and storage. The data can then be used to build a project assessment indicative of the scope of the project. For example, a user can obtain an assessment of a project associated with developing a webpage by entering data in the form of answers 202 to the questions 204. A project assessment can be generated to display information about the project via a user's computer device, which can include, but is not limited to, the scope of the webpage development project, the costs that may be associated with developing the webpage, and recommended webpage developer contractors to perform aspects of the webpage development project. The project assessment can be generated in real-time by dynamically reacting to data entered. For example, a questionnaire module 200 may select questions from a question tree, the route of which can depend on previous answer(s) 202 entered.

Figure 1:
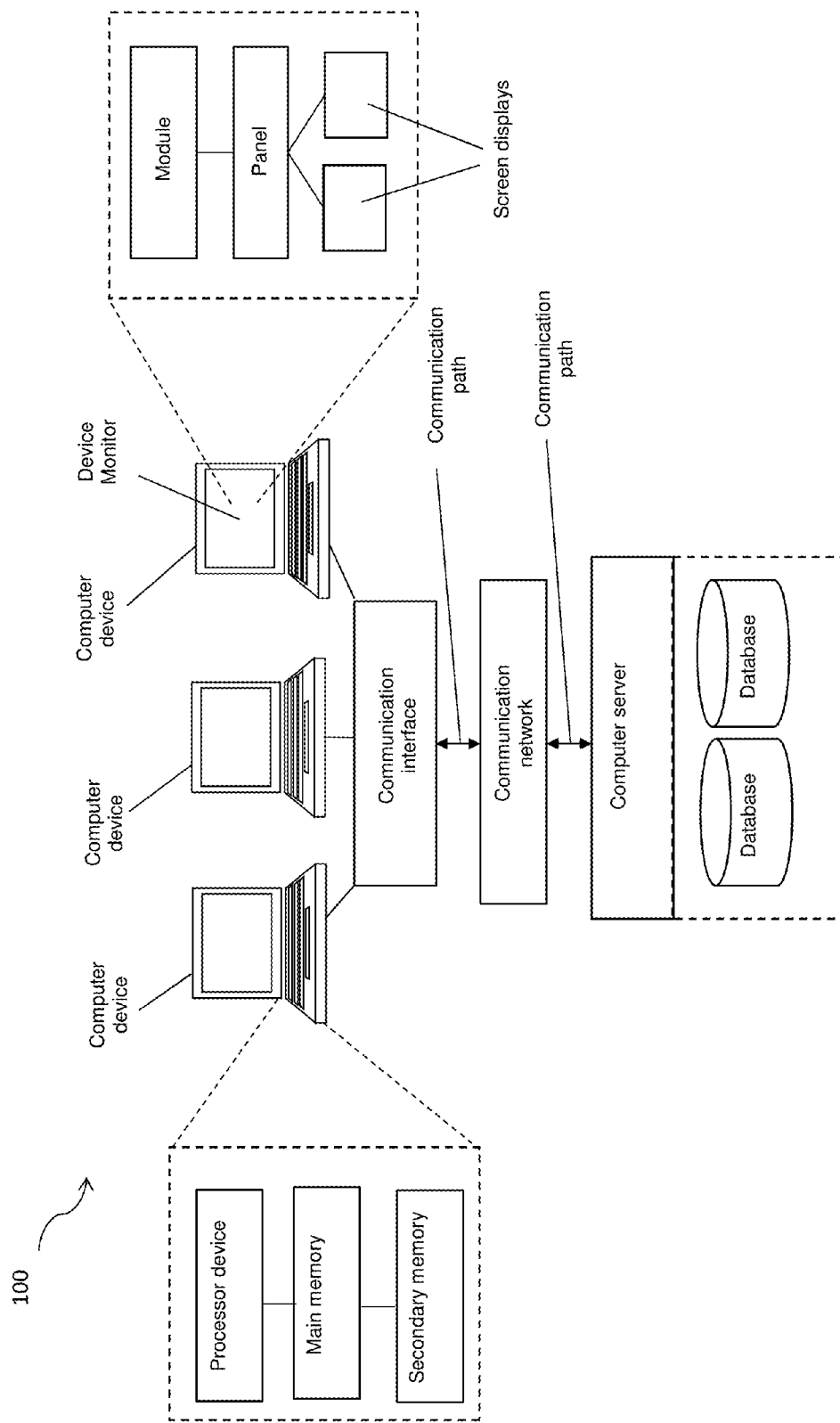
FIG. 1 is an exemplary computer system and network architecture that may be used to implement the assessment tool.

Referring now to FIG. 1, data acquisitioned from a database and/or any other computer device of the computer system may be transmitted to the computer system 100 to be manipulated by a processor device for generating functional aspects of various user interfaces that can be displayed by any of the computer devices in communication with the system 100. Wherever a user is referenced in this disclosure, it is understood that this reference includes computer device(s), computer server(s), and/or database(s) associated with the user's use thereof. Distributed communication networks used to enable connection and communication between each computer may include communications in whole, or in part, via web-sites through at least one communication network, which may include a web-server.

The computer system 100 may include a plurality of computer devices, computer servers, databases, communication networks, and communication path/connections. A user of the system 100 may use at least one processor device, memory storage, and communications interface to communicate and execute commands. Each computer server may be connected to at least one database, where software executed by each computer device may carry out functions of storing, coalescing, configuring, and transmitting data. Software may be stored on any type of suitable computer-readable medium or media. This may be a non-transitory computer-readable medium or media, such as a magnetic storage medium, optical storage medium, or the like.

A computer system architecture shown in FIG. 1 may enable interactions between computer devices, users of computer devices, and the computer system 100, which may be implemented using hardware, software, firmware, non-transitory computer readable media having instructions stored thereon, or any combination thereof, and may be implemented in a single or multiple of computer systems or other processing systems. Hardware, software, or any combination thereof may embody modules and components used to execute functions of the system. If programmable logic is used, such logic may execute on a processing platform or a special purpose device. Embodiments of the disclosed subject matter can be practiced by using various computer system configurations, including multi-core multiprocessor systems, minicomputers, mainframe computers, computers linked or clustered with distributed functions, and/or pervasive or miniature computers that may be embedded into virtually any device. For instance, a device comprising a processor device operably associated with a memory may be used to implement any disclosed embodiment of the invention.

A processor device may be a single processor, a plurality of processors, or combinations thereof. A processor device may have one or more processor cores. A processor device may be a special purpose or a general purpose processor device. A processor device may be connected to a communication infrastructure. A communication infrastructure may include, but is not limited to, a bus, message queue, network, multi-core message-passing scheme, etc.

The computer system 100 may include a main memory. A main memory may include, but is not limited to, a random access memory, a read-only memory, etc. The computer system 100 may include a secondary memory. A secondary memory may include, but is not limited to, a hard disk drive, a removable storage drive, a floppy disk drive, a magnetic tape drive, an optical disk drive, a flash memory, etc. Any of the main and the secondary memories can be a non-volatile memory.

Computer program medium, non-transitory computer readable medium, and computer usable medium may refer to tangible media, such as, for example, a removable storage unit and a hard disk installed in a hard disk drive. A removable storage drive may read from and/or write to a removable storage unit. A removable storage unit can include a removable storage media that can be read by, and written to, a removable storage drive. For example, if a removable storage drive is a floppy disk drive, a removable storage unit may be a floppy disk. A removable storage unit can also be non-transitory computer readable recording media.

In some embodiments, a secondary memory may include alternative means for allowing computer programs or other instructions to be loaded into the computer system 100. This may be, for example, a removable storage unit and/or an interface. Examples of such means may include, but are not limited to, a program cartridge and cartridge interface (e.g., as found in video game systems), a removable memory chip (e.g., Electronic Erasable Readable Programmable Read-Only Memory ("EEPROM"), Programmable Read-Only Memory ("PROM"), etc. and associated socket, and/or other removable storage units and interfaces.

The computer system 100 may include a communications interface. A communications interface may be configured to allow software and data to be transferred between devices within the computer system 100 and/or the computer system 100 and external devices.

Communications interfaces may include, but are not limited to, a modem, a network interface (e.g., an Ethernet card), a communications port, a Personal Computer Memory Card International Association ("PCMCIA") slot and card, etc. Software and data transferred via a communications interface may be in a form of signals, which may be electronic, electromagnetic, optical, or other signals. Signals may travel via a communications path, which may be configured to carry signals and may be implemented using wire, cable, fiber optics, a phone line, a cellular phone link, a radio frequency link, etc.

Computer program medium and computer usable medium may refer to memories, such as a main memory and a secondary memory, which may be memory semiconductors (e.g., Dynamic Random-Access Memory ("DRAM")). These computer program products may be means for providing software to the network. Computer programs (e.g., computer control logic) may be stored in a main memory and/or a secondary memory. Computer programs may also be received via a communications interface. Such computer programs, when executed by a processor device, may enable the computer system to execute commands and act upon the various components of the system. Accordingly, such computer programs may represent controllers of a disclosed computer system 100, where software may be stored in a computer program product and loaded into the computer system 100 using a removable storage drive, an interface, a hard disk drive, and/or a communications interface.

A computer device may be a processor, a microprocessor, minicomputer, server, mainframe, laptop, personal data assistant, wireless email device, cellular phone, smartphone, pager, fax machine, scanner, or any other programmable device configured to enable transmission and/or reception of data, which may be over a network. A computer device may include a peripheral device, such as an input/output device. A peripheral device may include, but is not limited to, a keyboard, a mouse, a screen display, a touch screen, a stylus pen, a monitor, a printer, a hard disk drive, a floppy disk drive, a joystick, an image scanner, etc.

One or more electronic computer networks may be utilized by the computer system 100 to promote communication among different components, transfer data, and/or share resource information. Such computer networks may be embodied as, but not limited to, at least one of Ethernet, wireless Local Area Network ("LAN"), Mobile Area Network ("MAN"), Wide Area Network ("WAN"), Virtual Private Network ("VPN"), Storage Area Network ("SAN"), Global Accelerator Network ("GAN"), Home Phoneline Network Alliance ("HomePNA"), etc.

In some embodiments, the computer system 100 may include a processor that can be operatively associated with at least one module, which may be programmed to display panels and/or screen displays on a computer device monitor. The processor may be programmed to execute computer-readable instructions included within a module. Computer-readable instructions may be in a form of software stored on a non-transitory computer readable medium operatively associated with a processor. Each module may be configured to generate a graphical user interface ("GUI") and/or other user interface enabling at least one user to issue commands, access data stored on a data storage media operatively associated with the processor, and/or transmit data to and from the data storage media. A module may include software, firmware, hardware, or any reasonable combination thereof.

A panel may be programmed to display information and grant access to data related to certain aspects and functionalities of the system 100. Through the various modules and panels, the computer system 100 can provide a communication network to orchestrate interaction between a user, the system 100, and the various components of the system 100. For instance, different panels of each module may be programmed to facilitate differentiated display of information and differentiated interaction between users, components of the system 100, and the system 100 itself.

Various embodiments of the present disclosure can be described in terms of the example computer system 100 described above; however, other embodiments of the computer system 100, along with other embodiments of computer architectures, can be used. Although operations may be described as a sequential process, some of the operations may be performed in parallel, concurrently, and/or in a distributed environment, and with program code stored locally or remotely for access by single or multi-processor machines. In some embodiments, the order of operations may be rearranged without departing from the spirit of the invention.

In some embodiments, a database of the system 100 can contain a library of historical-projects, such as, for example, plumbing projects, painting projects, cleaning projects, webpage development projects, information technology projects, etc. Data representing the historical-projects can be data obtained from real projects that have been completed. Historical-projects can be organized in accordance to project parameters 206. For example, a project parameter 206 may be the type of webpage to be generated (e.g., a website, a mobile app, etc.). Another project parameter 206 may be a type of webpage service to be provided (e.g., sale of merchandise, interaction/interfacing with users, social media, etc.). Another project parameter 206 may be the interactivity of the webpage to be developed (e.g., displaying information without any interactivity, setting up accounts and conducting financial transactions for merchandise, enabling uploads and downloads from the webpage). Another project parameter 206 can be the workload parameter (e.g., amount of time to complete the project, costs associated to complete the project, contractors that can perform the work to complete the project, etc.). The assessment tool can be configured to perform statistical analyses of the project parameters 206 to generate correlations, relationships, co-variances, etc. of the project parameters, which can be coalesced and stored in the database. As will be explained later, the historical-project data and the statistical data of the project parameters 206 can be used to generate a project assessment for a client's project.

Figure 2:
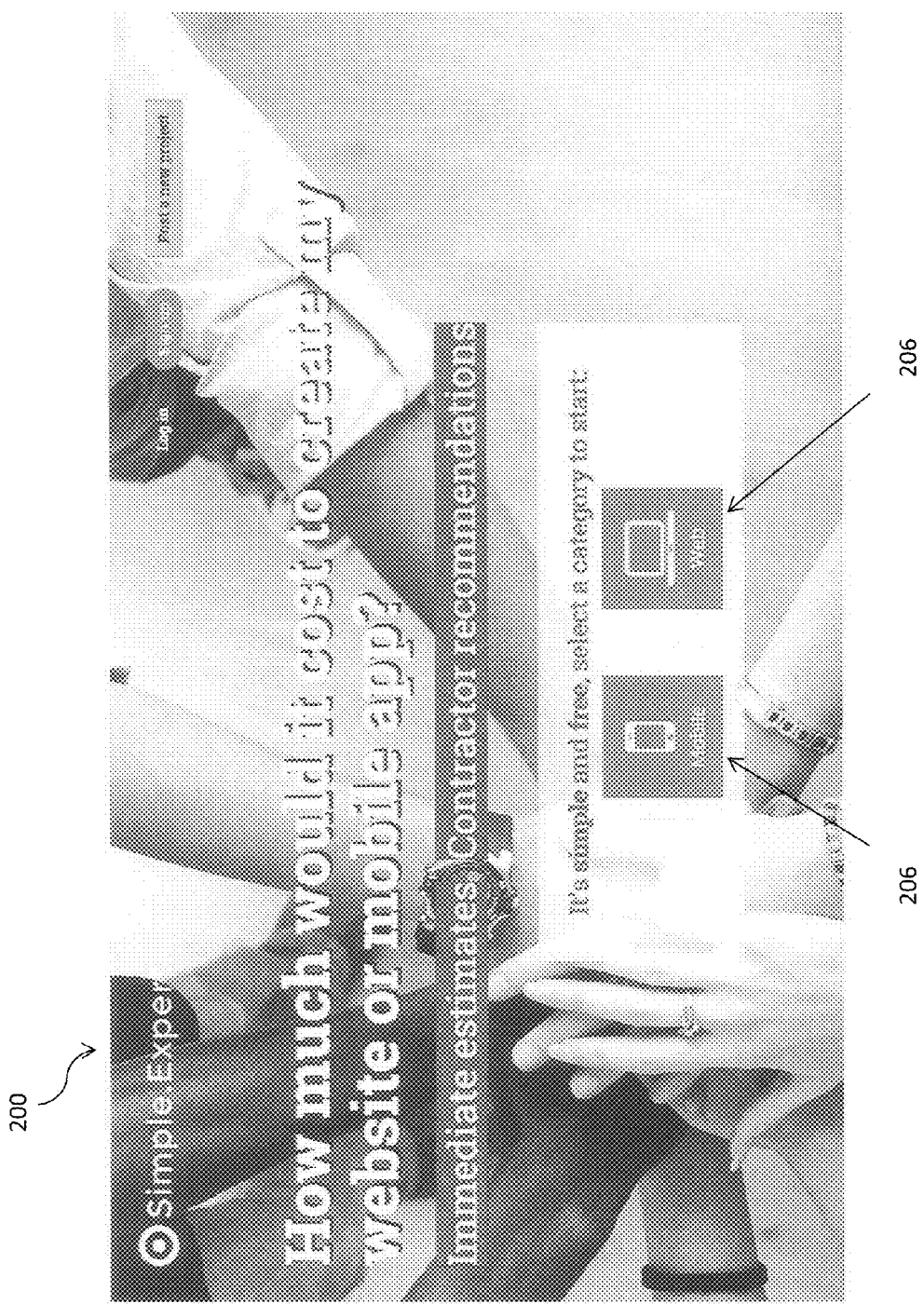
FIG. 2 is an exemplary user interface that can be displayed through a client-questionnaire module, enabling a client-user to select a type of webpage development project.
Figure 3A:
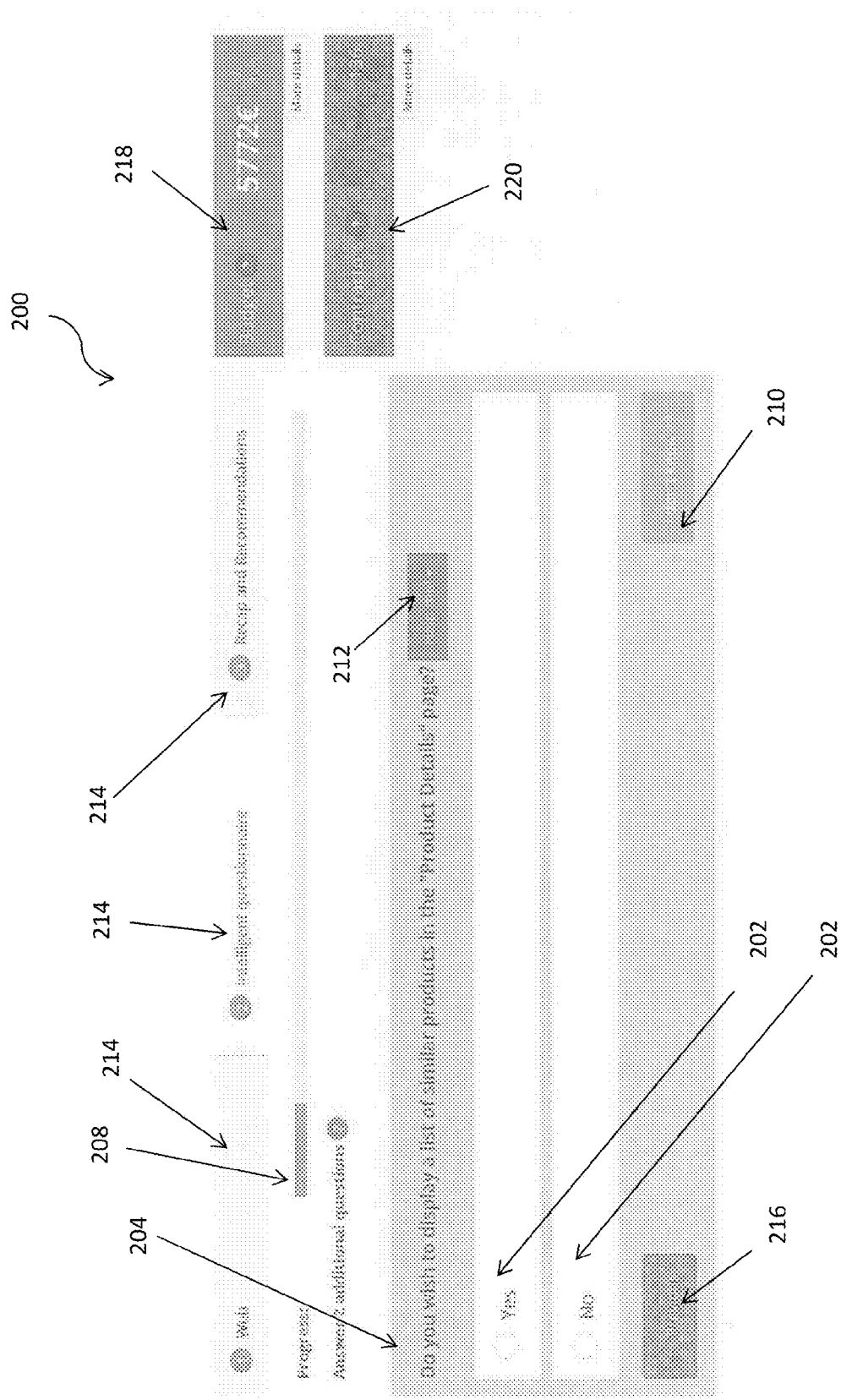
FIGS. 3A-3B are exemplary user interfaces that can be displayed through a client-questionnaire module, enabling a client-user to enter answers through populated questions.
Figure 3B:
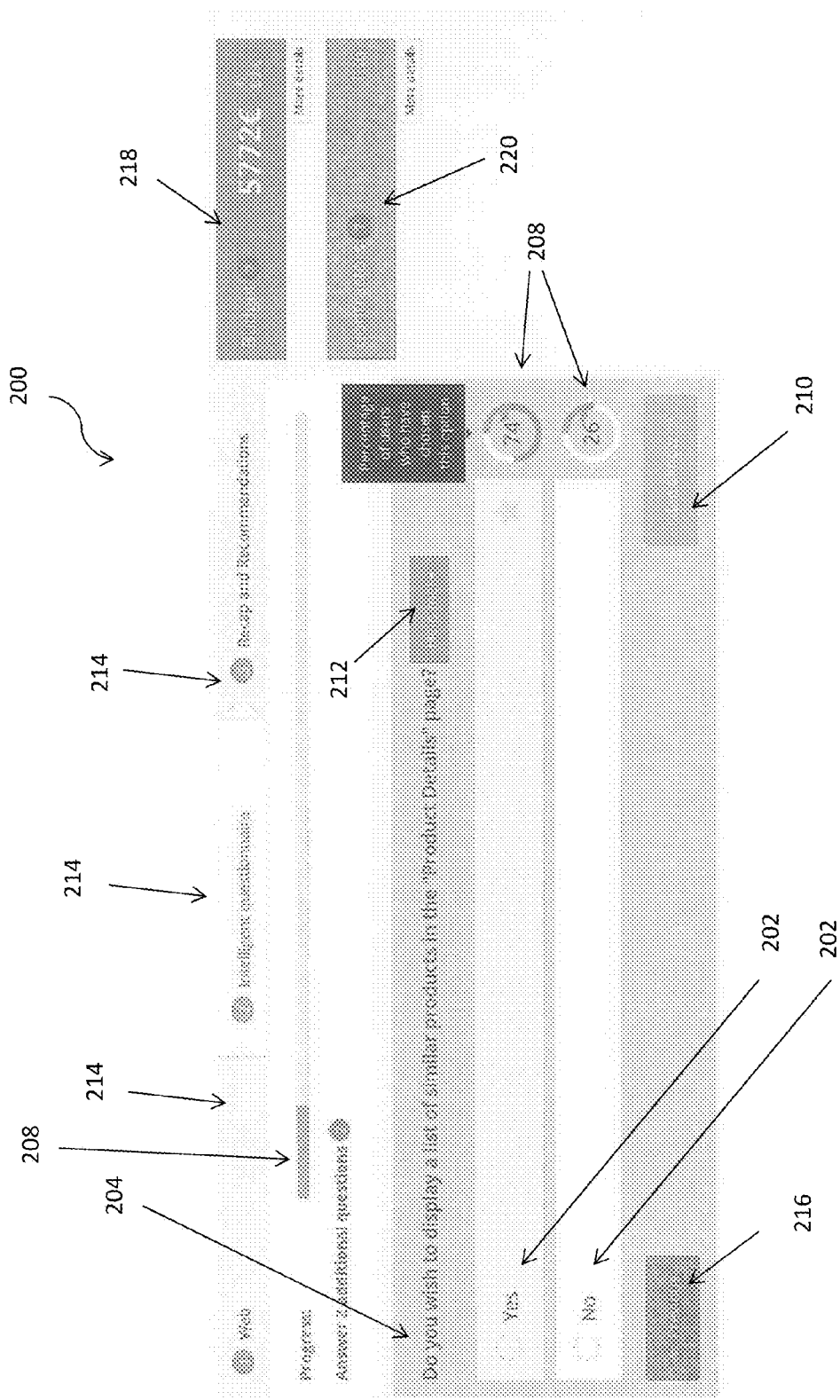

As shown in FIGS. 2 and 3A-3B, a client-user can enter data about the client's project in the form of answers 202 to questions 204 via a client-questionnaire module 200. This data, along with the historical-project data, can be used to generate a project assessment of a client user's project. Each question 204 populated by a client-questionnaire module 200 can be associated with at least one project parameter 206. For instance, a question 204, or a set of questions, may be associated with the type of webpage parameter 206 (e.g., a website or a mobile app) such that answers 202 to those questions 204 generate a relevance-indicator. The relevance-indicator can be used by the assessment tool to tag at least one historical-project that is most similar to the client user's project. This can be done by generating a relevance-indicator and tagging a plurality of historical-projects for each set of questions 204 that are answered. Each set of tagged historical-projects can then be used by the assessment tool to acquisition project parameters 206 of the tagged historical-projects corresponding to the project parameters 206 of the client user's project to generate statistical expectation values for the project parameters 206 defining the client user's project.

A relevance-indicator can be used to determine how relevant an answer 202 to a given question 204 is when the client-user's project is compared to historical-projects from the database. For example, the question "Is the project a 'webpage' or an 'app'?" can be much more relevant than the question "Are you going to use a payment solution in your project?". Continuing with the example above, a relevance-indicator can place more weight on the first question when historical-projects similar the client-user's project are pulled from the database. This can be done for each project parameter 206 associated with each question 204 or set of questions.

Additional statistical and numerical analytics can be used to determine a relevance-indicator for a project as a whole. For instance, the relevance-indicator(s) can be used to generate a project assessment that tags N number of historical-projects that have been determined by the assessment tool as most similar to a client's project being modeled by the project assessment. As an example, the assessment tool may tag twenty historical-projects, each with corresponding project parameters 206 having a relevance that matches, or is substantially similar to, the client's project. Being substantially similar may be having relevance-indicators within a range determined by a standard deviation, for example. Thus, the twenty tagged historical-projects can be deemed as the historical-projects having the most similarity with the project assessment of the client's project. As will be explained later, parameters 206 from the tagged projects can be used to provide a client-user with a scope of their project under assessment. For example, the costs associated with those twenty historical-projects can be averaged (e.g., mean average) to generate an "expected" cost for the project assessment. Other measures of central tendencies, variances, and deviations, as well as other statistical measures can be used.

It is contemplated for the tagging of the historical-projects to be dynamic. For example, as more questions 204 are answered 202 to generate a project assessment, selection of the tagged historical-projects may change, as well as the number of historical-projects being tagged.

Each answer 202 can be assigned an importance-indicator, which can be a weighted factor as to the answer's impact on a project parameter 206. For instance, a particular answer 202 may have significant bearing on the project parameter 206 of cost so that answer 202 may be assigned an importance-indicator of 10 as it relates to cost, whereas another answer 202 may have lesser bearing on cost so it may be assigned an importance-indicator of 1 as it relates to cost. In one embodiment, importance-indicator can be the standard deviation of the cost project parameters 206 of the tagged historical-projects as compared to the cost project parameters 206 of all of the historical-projects within the library of historical-projects. Thus, the standard deviation can reflect the importance of an answer 202 to a given question 204 as determined by is impact on the cost.

The populated questions 204 can be programmed to be closed-ended and/or open-ended. In a closed-ended configuration, a client-user can select an answer 202 from a predetermined set of answers 202, as shown in FIGS. 3A-3B. This may be achieved by a drop-down menu, selection of a radio button, etc. In a closed-ended configuration, a client-user may choose at least one answer 202 from the predetermined set of answers 202 for each question 204. In an open-ended configuration, a client-user can enter answers 202 via textual inputs. This may be achieved by generating a textbox through which a client-user can enter text. It is contemplated for natural language processing and machine learning technology to be used to extract tags from the text in order to quantify the answer 202. Technology, such as Open Calais by Thomson Reuters® may be used to perform such processing. This may enable comparison of textual answers 202 of open-ended questions 204 to other textual answers 202 to the same open-ended questions 204 that have been and/or will be entered for other projects.

In some embodiments, a client-questionnaire module 200 can be programmed to allow a client-user to skip a question 204. This may be achieved by activation of an "I don't know" actuable element 210. Alternatively, a client-questionnaire module 200 can be programmed to not advance to a next question 204 unless an answer 202 is provided. In the even a client-user skips a question, the system 100 can be programmed to generate a default answer 202. In some embodiments, the system 100 can provide a user with statistics of prior selections for a given answer 202. For example, if a question 204 is provided with predetermined answers 202, each populated answer 202 for selection can be provided with a historical percentage 208 for which the answer 202 has been selected for that question 204 and/or set of questions. This may assist client-users in selecting an answer 202 if they are unsure as to which answer 202 to choose. In some embodiments, the system 100 can automatically recommend answers 202 to a client-user based on a history of the projects and the answers 202 given by other users. In some embodiments, a client-user can ask recommendations as to which answer 202 to choose. This may be achieved by enabling communications with an administrator of the assessment tool via a "Help me!" actuable element 212. For example, a client-questionnaire 200 may be provided with a "contact" link, "email" link "live chat" link, etc., enabling a client-user to communicate with the administrator upon activation of the "Help me!" actuable element 212. In some embodiments, actuating the "Help me!" actuable element 212 can cause the historical percentage 208 for each answer 202 to appear, whereas the historical percentage 208 may be hidden from view otherwise.

Upon accessing a client-questionnaire module 200, a client-device may be caused to generate a project-type screen display as shown in FIG. 2. This may be a landing webpage for the assessment tool. A client-user can create an account, log in to an already existing account, and/or post a new project. A client-user may be presented with a first set of questions 204, which pertain to a type of project (e.g., project-type project parameter 206) a client-user is attempting to obtain a project assessment for.

A client-device may then be caused to generate a questionnaire screen display, as shown in FIGS. 3A-3B. A questionnaire screen display may include actuable header tabs 214, enabling a client-user to cause a client-user device to toggle between a project-type screen display, a questionnaire screen display, and a recap and recommendations screen display. A client-questionnaire module 200 can be programmed to display a "previous" actuable element 216 within a portion of the questionnaire screen display to facilitate navigating to a previous display. A client-questionnaire module 200 can be further programmed to display a progress bar GUI 218 indicating a client-user's progression through a client-questionnaire module 200. A progress bar GUI 218 can be programmed to indicate the number of steps that have been completed as compared to the number of total steps required to complete the questionnaire for a project assessment. Alternatively, the progress bar GUI 218 can be programmed to indicate the number of questions 204 that have provided with been answered 202 compared to the number of total questions 204 for the questionnaire of a project assessment.

The client-questionnaire module 200 can be further programmed to display a budget indicator 218 and/or a contractor indicator 220. A budget indicator 218 may display expected costs associated with a client-user's project as a client-user progresses through a client-questionnaire module 200. A budget indicator 218 may display a cost that changes as more questions 204 are answered 202. A budget indicator 218 can also display a statistic associated with the cost. For example, the cost may be calculated as an average of the costs taken from the library of historical-projects most similar to a client-user's project, and the statistic may indicate the standard deviation, confidence interval, or some other statistic associated with that average. A contractor indicator 220 may display the number of contactors within the database that have and/or can perform the work to complete the project being defined by a project assessment being generated via a client-questionnaire module 200.

Figure 4:
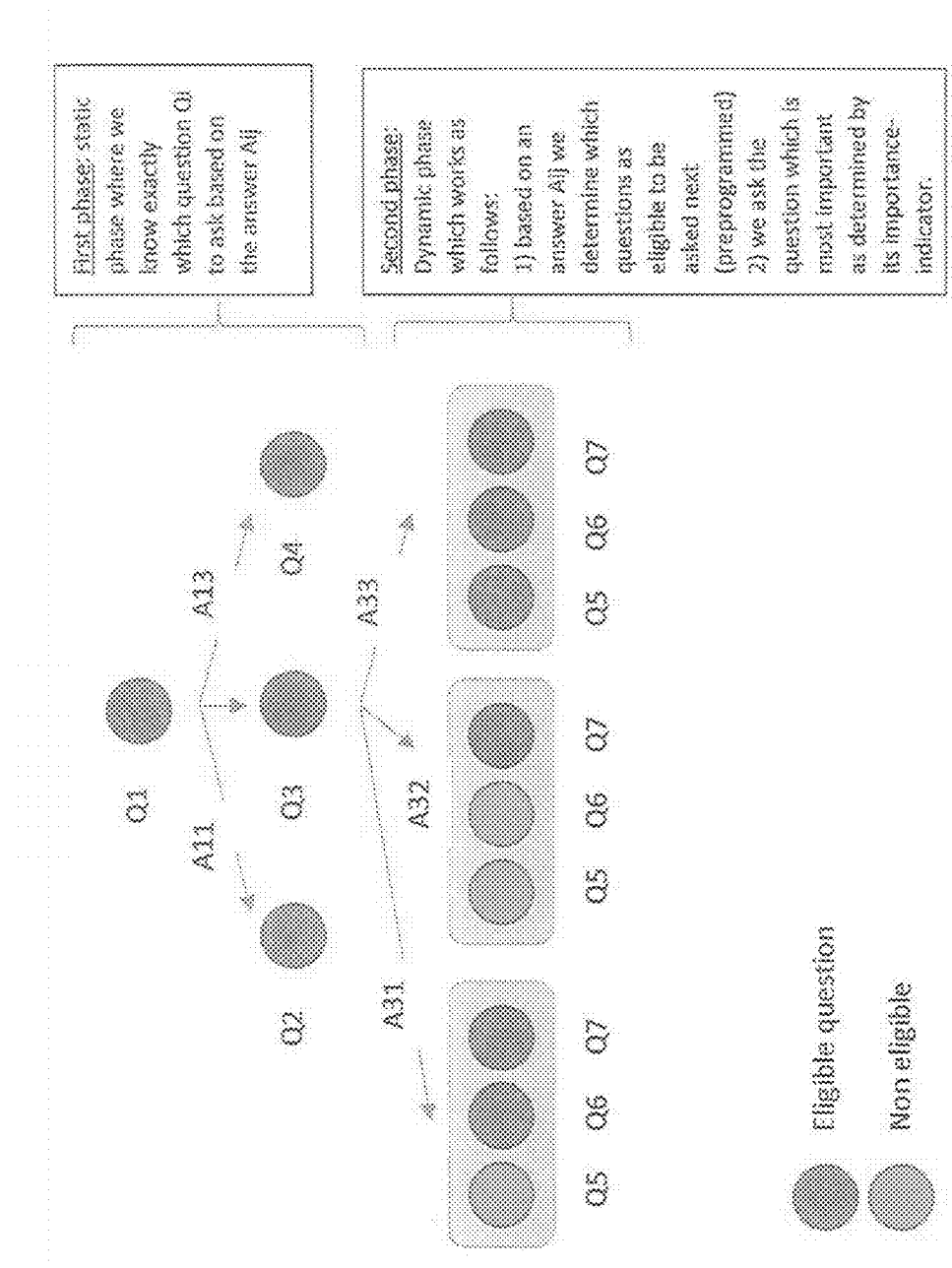
FIG. 4 is an exemplary flow diagram for a questions tree that may be used with the assessment tool.

A client-questionnaire module 200 can be programmed to populate questions 204 dynamically, which can be based upon answers 202 received by a client-user. For example, a client-questionnaire module 200 can pull questions 204 from a question bank in real time as answers 202 are provided. Each question(s) 204, or set of question(s), populated can be dependent on an answer(s) 202 of a previous question(s) 204. Additionally, each question(s) 204, or set of questions, can be dependent on the data acquisitioned from the database pertaining to historical-projects being associated with as a project assessment being generated. The population of questions 204 can also follow a question tree, the direction of which may depend on the answers 202 provided and/or the data acquisitioned from the database pertaining to the historical-projects. (See FIG. 4). The question tree can be predefined and/or developed dynamically in real time as answers 202 are received by client-users and/or data acquisitioned from the database. For example, if a client-user enters an answer 202 for which the assessment tool determines that a webpage development project is for social media services, for example, the question tree may branch off to a set of questions 204 specifically related to social media services. Questions 204 related to the specific question tree branch may be pre-defined and/or generated dynamically. For example, questions 204 related to social media services may be sets of questions 204 that pertain to work specific to development of social media webpage development. However, the assessment tool can also be programmed to acquisition project parameters 206 from the tagged historical-projects as the project assessment is being generated, thus the question tree branch can be generated based on the answers 202 received and the data acquisitioned from the library of historical-project data. For instance, the next question 204 and/or set of questions can depend on the answer 202 and the project parameters of the historical-projects tagged. Thus, real time development of questions 204, sets of questions, or even question branches of the question tree can be performed.

Each client-device can be in communication with the system 100 so data entered via a client-questionnaire module 200 can be transmitted to the system 100 for processing and storage by the system 100. Similarly, the system 100 can transmit data to a client-device to dynamically update questions 204 being displayed on a client-device. As answers 202 are being entered and questions 204 are being generated, the assessment tool begins to generate a project assessment of a client-user's project. A project assessment may be structured as a compilation of answer-data and historical-project data with associated relevance-indicators and importance-indicators that can be displayed in a coalesced format, communicating the scope of a client-user's project.

Figure 5:
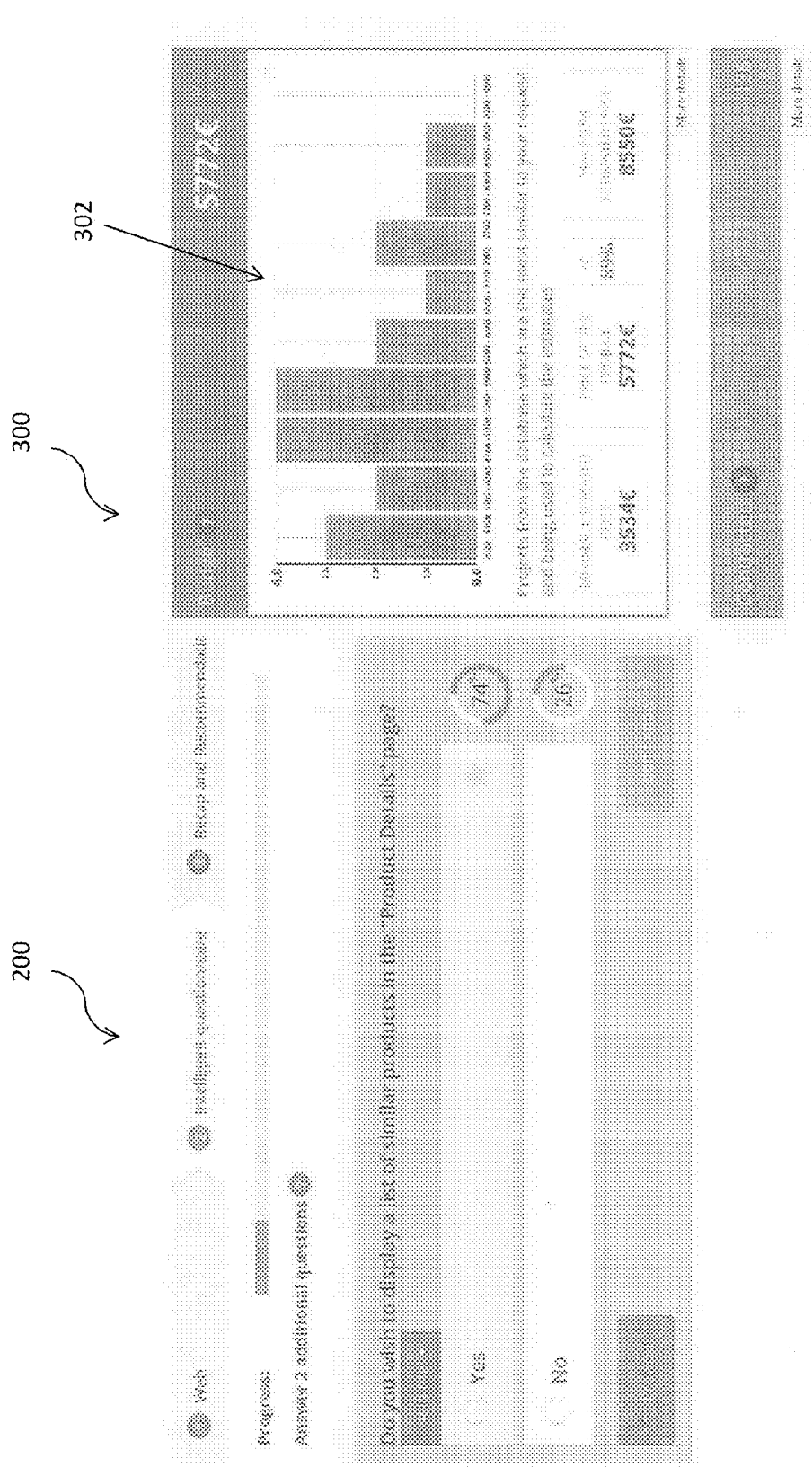
FIG. 5 is an exemplary user interface that can be displayed through a project assessment module, showing a budget display panel.

A project assessment can be displayed via panels and display screens accessible through a project assessment module 300 that may be displayed on a client-user's device. In some embodiments, a project assessment module 300 can be displayed adjacent a questionnaire screen display or as part of a questionnaire screen display. A project assessment module 300 can display a model of a client-user's project with expectation values for each project parameter 206 of a model project. For example, a model project may display an expected time to complete a project, an expected cost to complete a project, an expected number of contractors to complete a project, etc. This information may be displayed textually and/or graphically. For example, a budget panel 302 can be displayed via a project assessment module 300 to graphically illustrate expected costs. (See FIG. 5). A budget panel 300 can also be programmed to display a range of costs taken from a tagged list of historical-projects and other statistical data, such as accuracy and precision of the estimated costs, expected maximum and minimum estimated costs, etc. Typically, the more answers that are provided by a client-user about their project, the more precise and more accurate the estimates can be. Thus, a measure of the precision and accuracy of the cost estimate may also be illustrated in the budget panel. For example, FIG. 5 shows a budget panel 302 illustrating a histogram of costs for a plurality of historical-projects that have been determined to be most similar to a client-user's project. The histogram may include a Gaussian distribution graph in a background portion of a histogram, along with statistical data, such as minimum estimated cost, maximum estimated cost, an expected cost value, standard deviation of cost, etc.

Information about a model project of a project assessment displayed on a client-user's device can be used by a client-user for decision-making and planning. As will be explained later, a client-user can also submit a model project and project assessment data to recommended contractors via the assessment tool to obtain actual bids to perform the work. Thus, the assessment tool can be programmed to facilitate communication between client-users and contractor-users.

The assessment tool can be programmed to update the library of historical-projects with project assessments generated by the system 100. This can be done by updating selected project parameters 206 in the database and/or statistics thereof by using a client user's project parameters 206.

In some embodiments, the database further contains a library of contractor portfolios 304, which may include service provider portfolios and vender portfolios. Each contractor portfolio 304 may include provider-projects 306, which may be data representing real projects that have been completed. This data may also include data representing projects typically performed by a given contractor. The provider-projects 306 can be organized by expert parameters, where each expert parameter can be an indication of the services performed by a contractor. For example, contractor A may have a contractor portfolio A that includes a plurality of provider-projects 306 for which contractor A has performed. Each of the provider-projects 306 of contractor portfolio A that pertains to mobile app development may be assigned an expert parameter for mobile app development. Numerical analytics can be used to quantify the extent and skill contractor A has with mobile app development, by which contractor A can be assigned an expertise-indicator 310 regarding that expertise parameter. For example, if a certain percentage (e.g., 80%) of the provider-projects 306 of contractor portfolio A has an expert parameter for mobile app development, then contractor A may be associated with an expertise-indicator 310 signifying a level of expertise exhibited by contractor A in the field of mobile app development. Other expertise-indicators 310 can be generated for other contractors. Other methods and means to generate and assign expert parameters and/or expertise-indicators 310 can be used. Expertise-indicators 310 of each contractor can also be normalized and ranked against all contractors having a contractor portfolio 302. As will be explained, a client-user may be presented with a contractor panel 308 displayed via a client-user's project assessment module 300 to illustrate which contractors have performed services related to a client's project, an expertise ranking, a number of similar projects each contractor has performed, details of similar projects performed, etc. (See FIG. 6).

In the alternative, or in addition, a contractor may be assigned an experience-indicator. An experience-indicator may be a ranking of contractors who have performed work for projects that are most similar to the client-user's project. In some embodiments, an experience-indicator can be displayed separately from an expertise-indicator 310. In other embodiments, an expertise-indicator 310 can use an experience-indicator as a factor to generate the expertise-indicator 310. For example, contractor A may be assigned extra points if contractor A has a higher experience-indicator as compared to other contractors within the list contractors who have performed work on projects similar to those of a client-user's project.

Figure 7A:
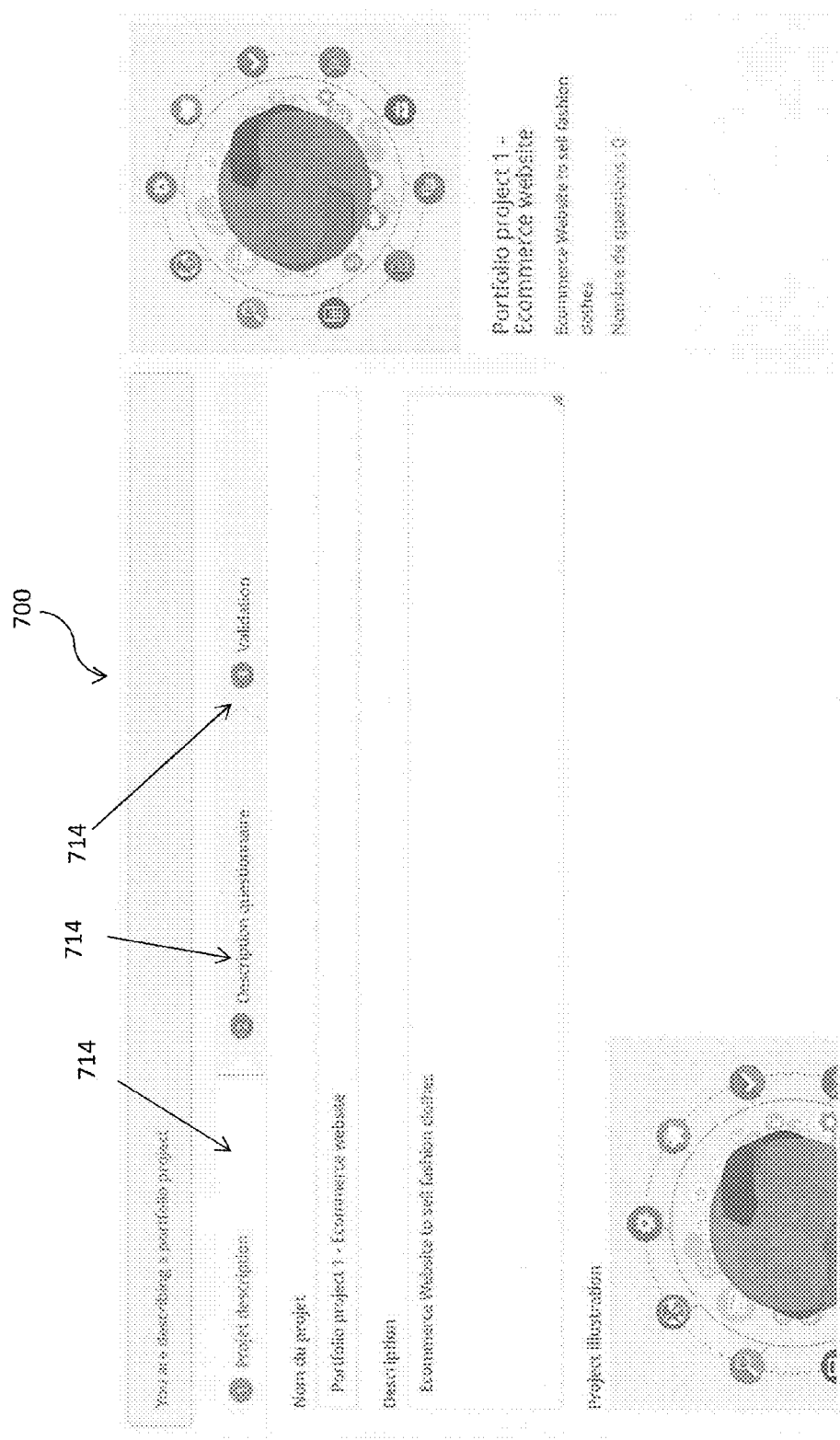
FIGS. 7A-7C are exemplary user interfaces that can be displayed through a contractor-questionnaire module, enabling a contractor-user to enter data pertaining to a provider-project.
Figure 7B:
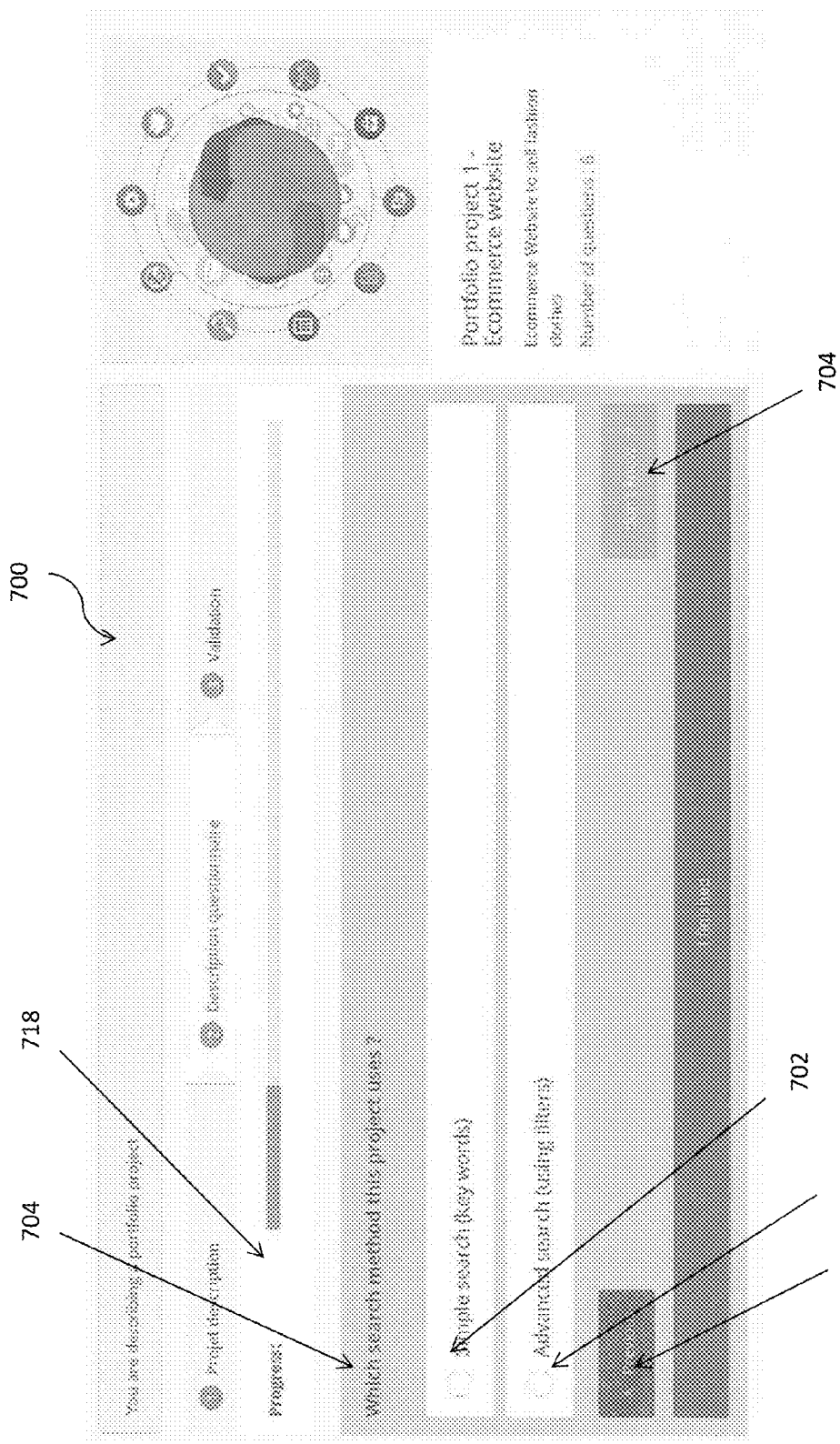
Figure 7C:
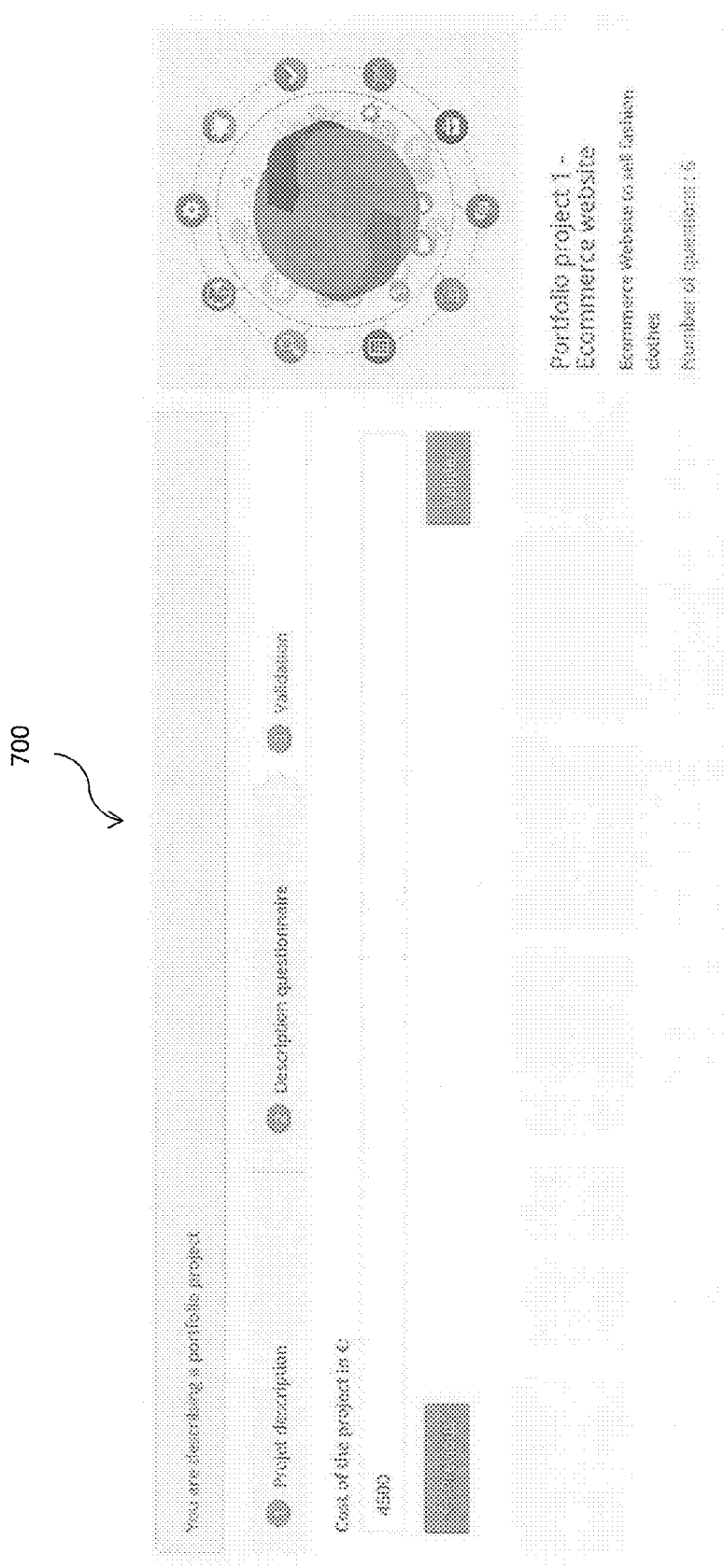

As shown in FIGS. 7A-7C, contractor portfolio data can be entered by contractor-users via a contractor-device and/or by administrators of a host system/assessment tool on an administrator-device. Entering contractor portfolio data can be achieved through a contractor-questionnaire module 700 that may be similarly configured as the client-questionnaire module 200 described above. A contractor-questionnaire module 700 can include actuable header tabs 714, enabling a contractor-user to cause a contractor-user device to toggle between a project description screen display, a description questionnaire screen display, and a validation screen display. An exemplary project description screen display is shown in FIG. 7A, which may enable a contractor-user to enter project category and project type information about a provider-project for a contractor profile.

After a contractor-user has provided enough answers 702 to define a category and/or type of project, a contractor-user can navigate to a description questionnaire screen display, shown in FIG. 7B. This can be done automatically by the system 100 and/or a contractor-user can navigate to a description questionnaire screen display at his/her discretion by actuating a description questionnaire tab 714. A contractor-questionnaire module 700 can be further programmed to display a progress bar GUI 718 indicating a contractor-user's progression through a contractor-questionnaire module 700. A progress bar GUI 718 of a contractor-questionnaire module 700 can be similarly configured as a progress bar GUI 218 described above. A contractor-questionnaire module 700 can be similarly programmed as a client-questionnaire module 200 in that contractor-users can enter data in the form of answers 702 to questions 704. A contractor-questionnaire module 700 can be programmed to display a "previous" actuable element 716 within a portion of the questionnaire screen display to facilitate navigating to a previous display. A contractor-questionnaire module 700 can be further programmed to display an "I don't know" actuable element 710, enabling a contractor-user to skip a question 704.

After a contractor-user has provided enough answers 702 to generate a provider-project, the contractor-user can navigate to a validation screen display, shown in FIG. 7C. This can be done automatically by the system 100 and/or a contractor-user can navigate to a validation screen display at his/her discretion by actuating a validation tab 714. A validation screen display can enable a contractor-user to enter at least one project parameter (e.g., cost to complete the project) associated with each provider-project to be validated by an administrator of the assessment tool. Validation of project parameters will be discussed later.

Provider-projects 306 stored in the database can be segmented into at least two categories. A first category of provider-projects 306 can be provider-projects 306 entered by contractors. A first category of provider-projects 306 can also be verified by administrators of the assessment tool. A second category of provider-projects 306 can be provider-projects 306 that have been negotiated through administrators of the assessment tool. For example, verified projects may be projects that have been declared by contractors and wish to be submitted through a contractor-questionnaire module 700. An administrator of the assessment tool can review the declared projects to determine if the information is trustworthy. This can be done by communicating with a contractor, corroborating with to a client-user, and/or using the experience and expertise of the administrator to determine if the parameters that have been declared (e.g., price of a project) are plausible. Negotiated projects may be projects that have been granted after a real bid has been made on a project by a real contractor via the assessment tool.

Expertise-indicators 310 may then be used by the assessment tool to display recommended contractors to perform aspects of a client user's project. This can be displayed in a contractor panel 308 via a project assessment module 300. A client-user may also be able to view which provider-projects fall within one of the first or second categories described above.

Figure 8:
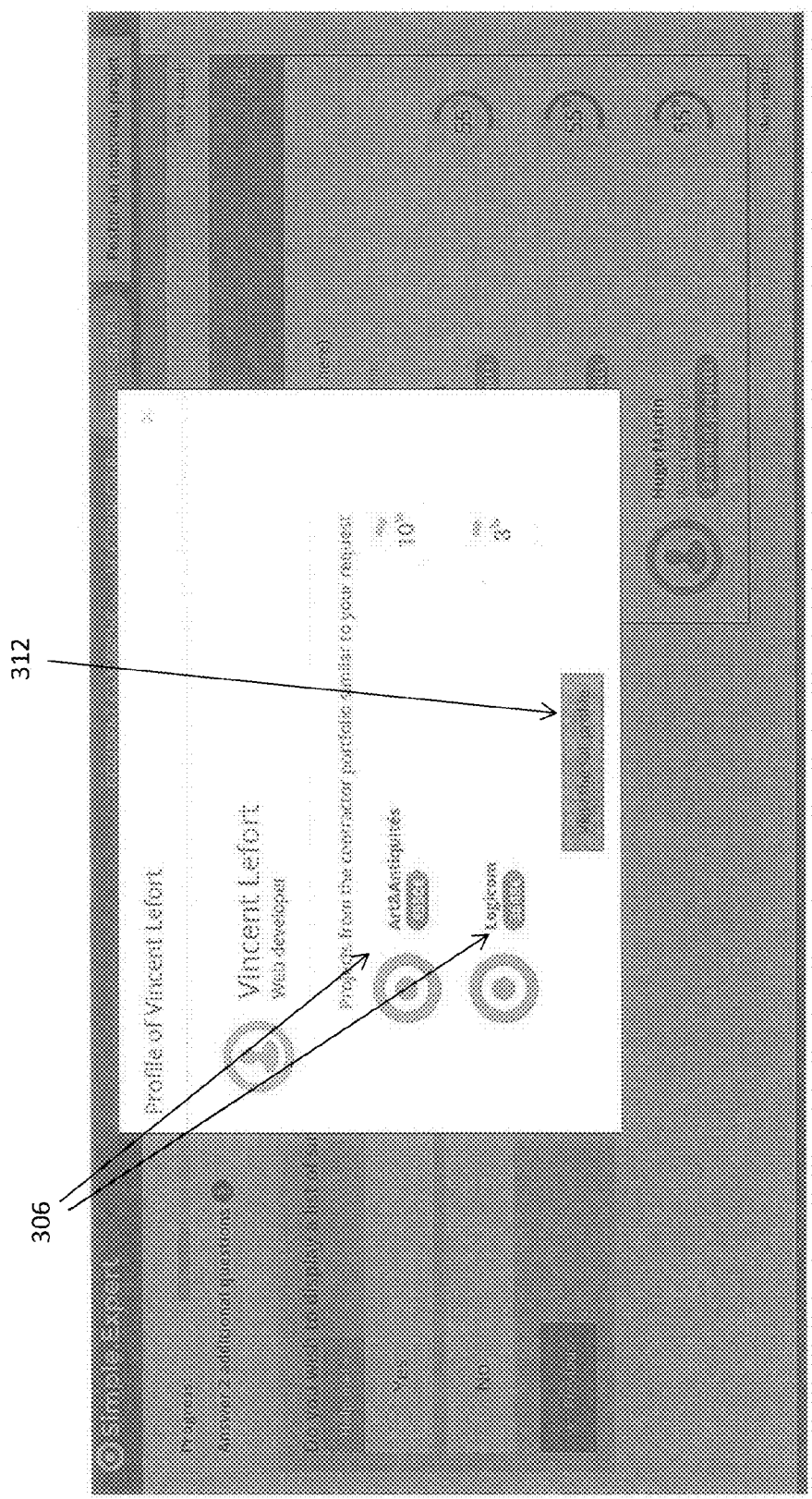
FIG. 8 is an exemplary contractor profile screen display that can be displayed through a project assessment module.

As a client-user enters data in the form of answers 202, the system 100 can begin acquisitioning contractor profile data from the database to cause a client-device to generate a contractor panel 308. A project assessment module 300 can be programmed to display a list of contractors that have and/or can perform the work to complete a project defined by a project assessment. A list of contractors can be ranked by expertise-indicator 310, number of similar projects they have completed, average cost to perform similar project, etc. A client-user can access more detail about each contractor and provider-projects 306 associated with that contractor by activating an actuable contractor profile element 304. Activating an actuable contractor profile element 304 for a given contractor can cause a client-device to display a contractor profile screen display, as shown in FIG. 8. From a contractor profile screen display, a client-user can view a full profile of a contractor by activation of an actuable "View the full profile" element 312.

Figure 9:
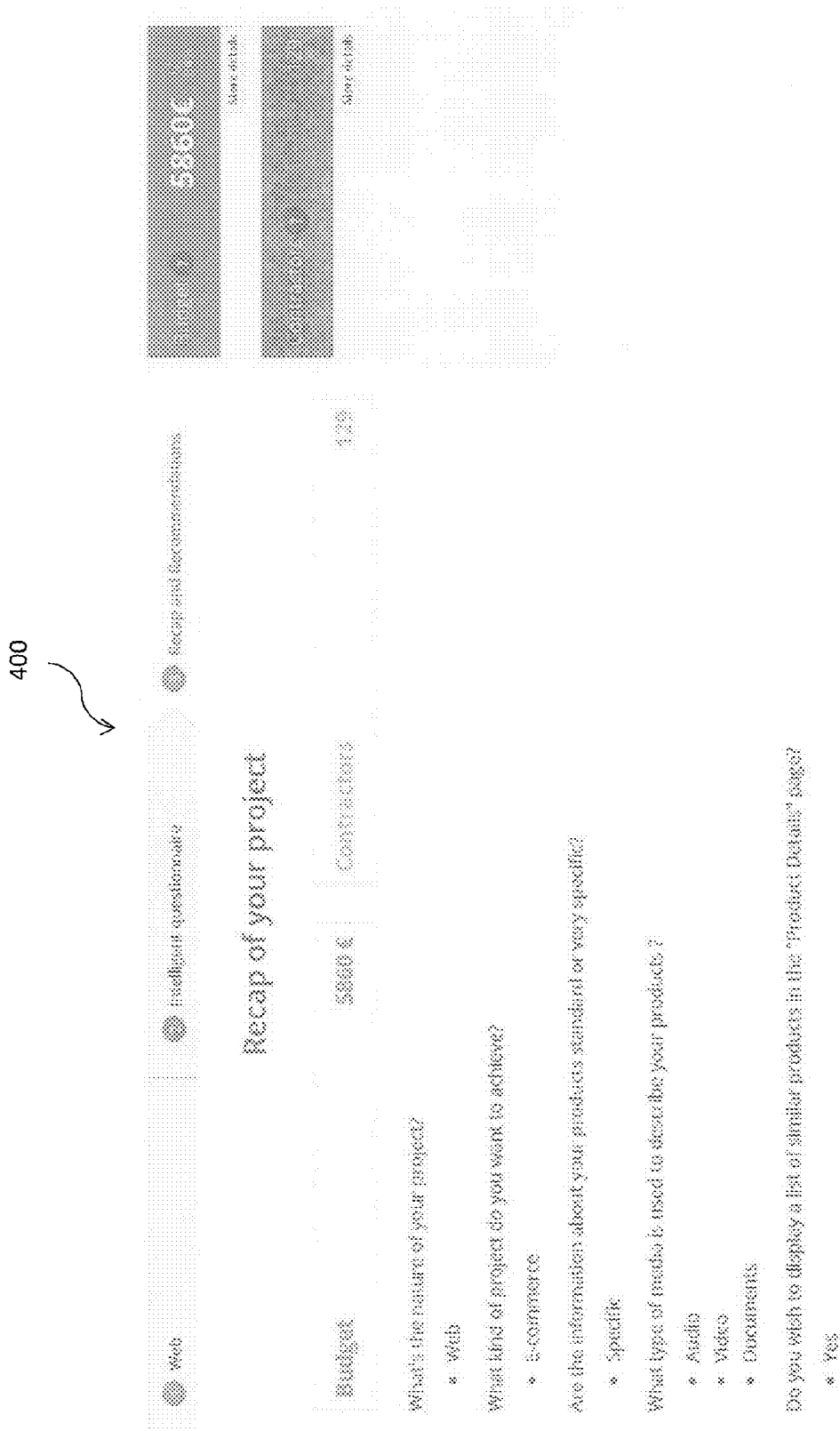
FIG. 9 is an exemplary user interface that can be displayed through a recapitulation and recommendations module, showing a model project that can be generated for a project assessment.

After a client-user has provided enough answers 202 to generate a project assessment, a client-user can navigate to a recapitulation and recommendations module 400. (See FIG. 9). The system 100 can be programmed to generate and update a recapitulation and recommendations module 400 as answers 202 are being provided. Thus, a client-user can navigate to a recapitulation and recommendations module 400 at his/her discretion by actuating a recapitulation and recommendations header tab 214. Alternatively, or in addition, the system 100 can cause a client-device to automatically navigate to a recapitulation and recommendations module 400 after all of the questions 204 for a given project assessment have been provided answers 202. A recapitulation and recommendations module 400 can generate a recap screen display with a summary of the information that can define the scope of a client-user's project. This may include, but is not limited to, the nature of a project, the kind of project, the level of information (in the form of the number of answers provided to define a project) for a project, etc. A recap screen display can be further programmed to display cost/budget information, the number of contractors recommended for a project, etc.

Figure 10:
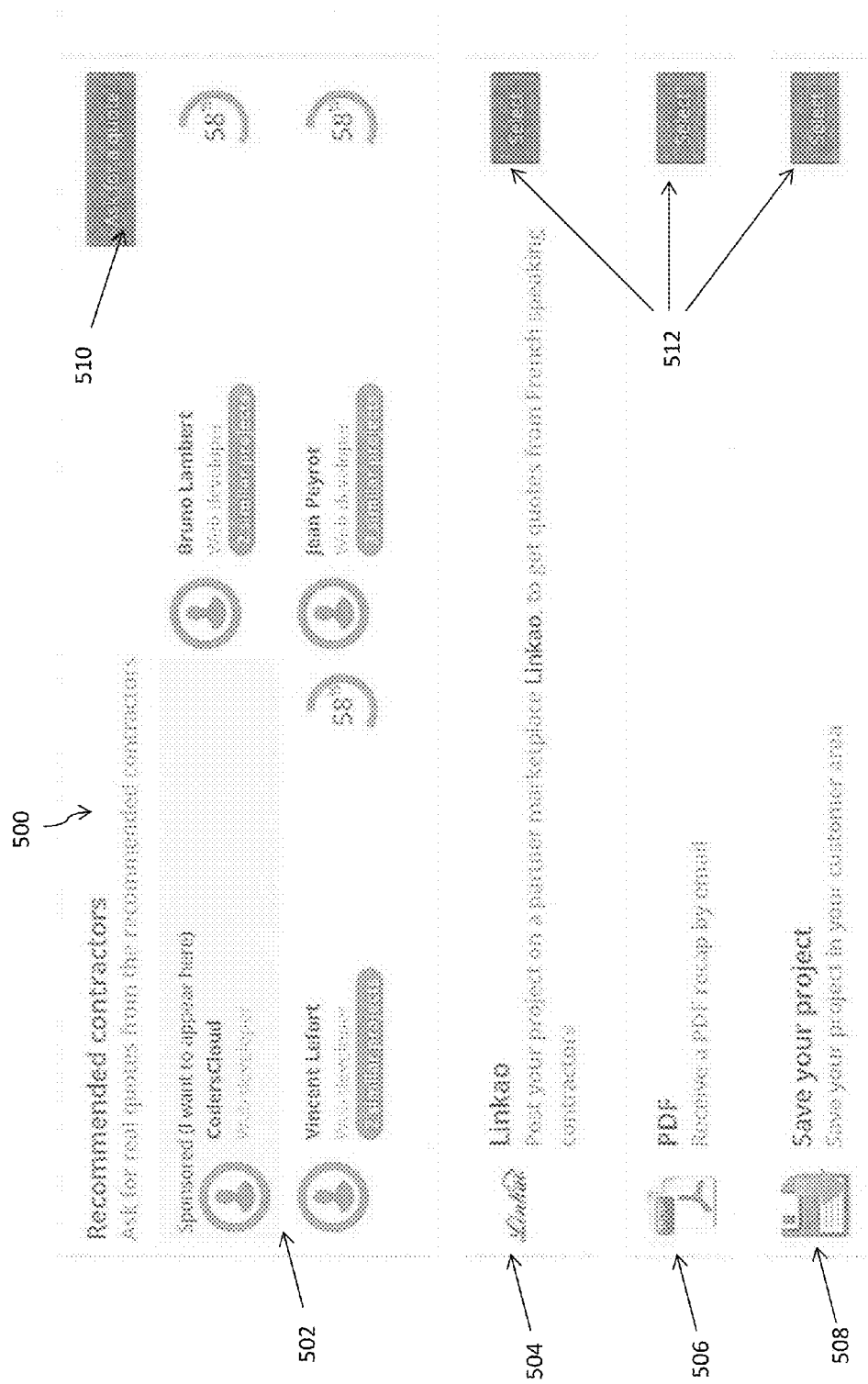
FIG. 10 is an exemplary user interface that can be displayed through a project assessment module enabling a client-user to select a contractor to perform work to complete a project.
Figure 11:
FIG. 11 is an exemplary user interface that can be displayed through a recapitulation and recommendations module, enabling a client-user to commission work for the project based on the project assessment.

A client-user may use the information displayed via the recap screen display to decide which contractor to contact to solicit quotes and bids from to perform the work to complete a project. A client-user can also save a project assessment and/or create .pdf of a project assessment and/or model project. With a saved project assessment, a client-user can also post a project assessment and/or model project to solicit quotes and bids. This may include posting a project assessment and/or model project on a partner freelancer platform. Performing any one of these options can be achieved through the system 100 through a completed project assessment user interface 500, as shown in FIGS. 10-11. A completed project assessment user interface 500 can be programmed to display a recommended contractor section 502, a post your project section 504, a generate .pdf section 506, a save your project section 508, etc. A recommended contractor section 502 can be programmed to display a list of contractors recommended by the assessment tool in a manner similar to a contractor panel 308 described above. An "Ask for a quote" actuable element 510 can be programmed to cause a client-device to transmit project assessment and/or model project data to at least one contractor having a contractor profile within the system 100 so that a contractor can respond with a quote and/or bid for a project. Other "select" actuable elements 512 can enable a client-user to cause a client-device to post a project assessment and/or model project to a partner freelancer platform, save a project assessment and/or model project, and/or generate a .pdf of a project assessment and/or model project.

FIG. 11 shows an exemplary user interface through which a client-user has activated an "Ask for a quote" actuable element 510. In addition to transmitting project assessment and/or model project data to at least one recommended contractor, a client-user can include additional information about a project. For example, a client-user can enter textual information about the name of a project and/or a brief description of a project.

Figure 12:
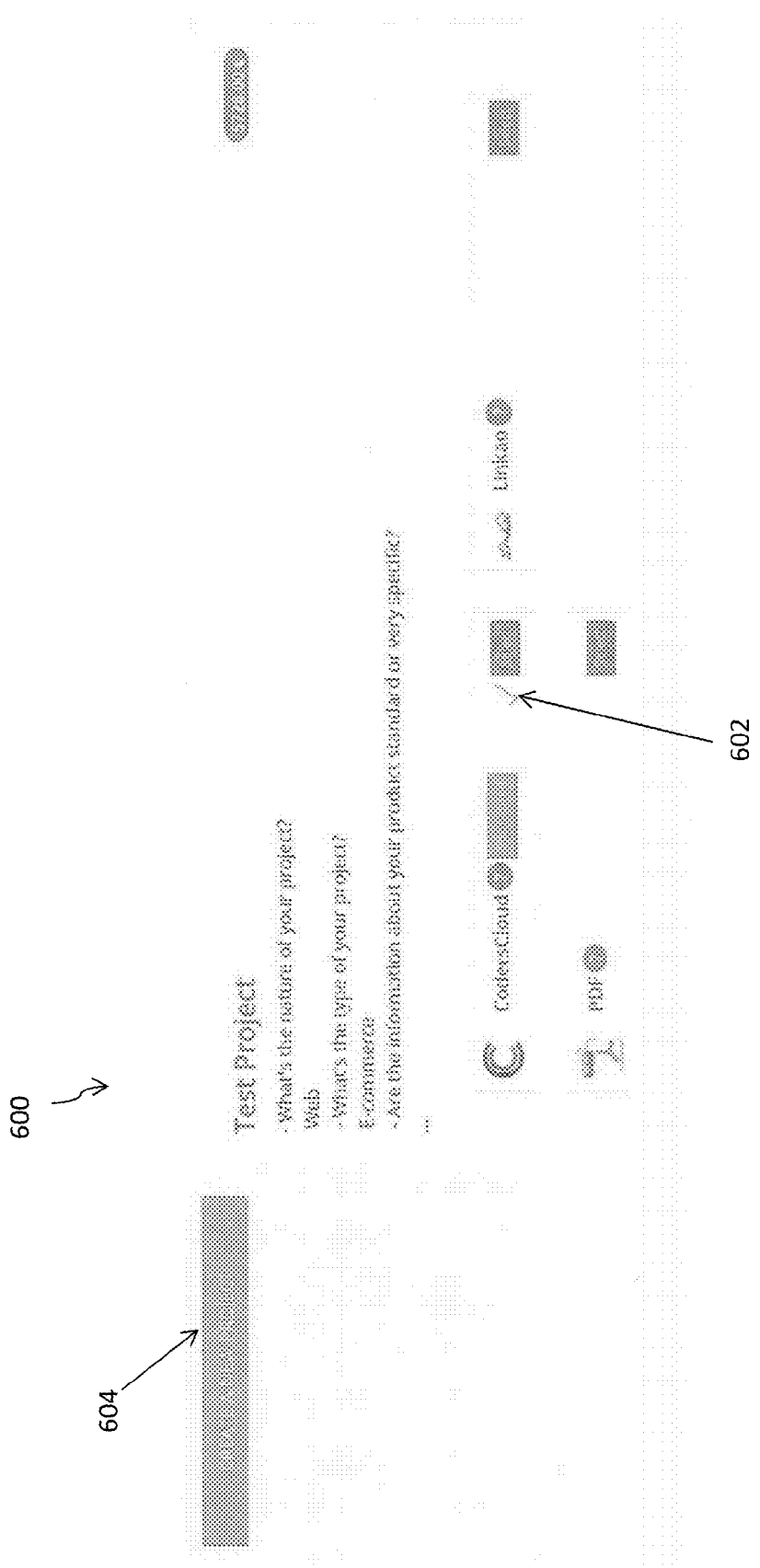
FIG. 12 is an exemplary control dashboard that can be displayed through on a client-user device of the system.

After a client-user has completed a project assessment and at least one of: 1) contacting a recommended contractor and asking for a real quote; 2) post a project on a partner freelancer platform; 3) generate a .pdf of a project assessment; and, 4) save a project, a client-user can navigate to a control dashboard 600. (See FIG. 12). Alternatively, or in addition, the system 100 can cause a client-device to automatically navigate to a control dashboard 600. From a control dashboard 600, a client-user can view what option(s) has been selected for each project assessment via a checkmark indicator 602 that may be displayed adjacent at least one of: 1) contacting a recommended contractor and asking for a real quote indicator, 2) post a project on a partner freelancer platform indicator; 3) generate a .pdf of a project assessment indicator; and, 4) save a project assessment indicator. A client-user can also navigate to a landing webpage by activating an actuable "create a new project" element 604.

Each of the client-device, contractor-device, and/or administrator-device can be in communication with the system 100 to receive and transmit data to/from at least one database of the system 100. The assessment tool can be programmed to operate a client-questionnaire module 200, a contractor-questionnaire module 700, a project assessment module 300, and a recapitulation and recommendations module 400 in parallel and/or concurrently so that data being entered, data being acquisitioned from the database(s), and data being displayed can occur in real-time. For example, as client-users enter data via a client-questionnaire module 200, data can be transmitted to the system 100 from a client-device and stored in a database. Similarly, as contractor-users enter data via the contactor-questionnaire module 700, data can be transmitted to the system 100 from a contractor-device and stored in a database. Similarly, as administrator-users enter data via an administrator-device, data can be transmitted to the system 100 from an administrator-device and stored in a database. As more data is being transmitted, the system 100 can update the libraries of historical-projects, contractor profiles 304, and provider-projects 306, as well as expectation values, expertise-indicators 310, etc. The system 100 can simultaneously transmit the updated data to a client-device as the data is being updated. Updates can be done concurrently with the entering of data from client-users, contractor-users, and administrator-users.

As more data is collected about a client's project, more data about a project assessment and/or a model project can be generated and displayed in real time. Furthermore, because the system 100 can handle multiple users, data being entered by multiple users, as well as statistical analytics data generated by the system 100, can be continuously updated. Thus, as a project assessment is being generated, a model project can be displayed with the most up-to-date information being entered into the system 100.

An exemplary method for applying the assessment tool may include: 1) Question and Answer Process; 2) Estimate Process; and 3) Recommendations Process.

Question and Answer Process

The goal of this phase can be to determine the scope of the client-user's project. This can be a step by step process, where the system may ask a question 204, receive an answer 202, and then determine which question 204 to ask next.

The Question and Answer Process phase may include a set-up phase, which can include use of a database of real projects (e.g., historical-projects). Each client project can be described by a set of questions 204 and answers 202 ("Q&As"), which may be associated with a project parameter 206 (e.g., price tag). A statistical computation may be performed to determine the answers 202 (and the corresponding questions) that can have the most impact on the price of the client's project. Each answer 202 may be given a weight (e.g., importance-indicator), which can reflect the standard deviation of the prices of the projects that include an answer as compared to all the projects. This standard deviation can reflect the importance of an answer 202 to a given question 204 as determined by its impact on the price. This set-up phase may be done on a regular basis to reflect the evolution of the database of the projects, the addition of new questions 204, and hence the change in the importance of the questions 204.

The Question and Answer Process phase may further include a dialogue phase. A first phase of the dialogue phase may be a static phase in which a client-user is asked a predetermined set of questions 204 to determine the category of the project. A second phase of the dialogue phase may be a dynamic phase. In each step in the process, the following information can be used to decide which question 204 to ask next:

1. A tree of questions 204 and answers 202 reflecting the dependence, when it exists, between the different questions 204 and answers 202 (e.g., some questions will not be asked unless a particular answer has been given to a previous question). This dependence may be entered manually by an administrator as a new question 204 is added to the set of questions 204.
2. The questions 204 and answers 202 and their importance as reflected by the weights calculated in the set-up phase.
3. The history of questions 204 and answers 202 already given by the client-user.

At each step, the previous information can be used to decide which questions 204 are eligible to be asked, and to ask the most important question 204 between the questions 204.

The questions 204 can be closed-ended. For example, to answer 202 a question 202, a user may choose at least one answer(s) 202 from a predetermined set of possible answers 202. More than one answer 202 may be selected when it is relevant. In the alternative, or in addition, the questions 204 can be open-ended. For example, a user may enter plain text as an answer 202. It is contemplated for natural language processing and machine learning technology to be used to extract tags from the text. Technology, such as Open Calais by Thomson Reuters® may be used to perform such processing. This can be used to compare text of answers 202 to the same open-ended questions 204 in other projects, which may facilitate generating recommendations and estimates accordingly.

Estimates

It is contemplated to use real provider-projects from the database to estimate the price of the model project being described in real-time. As described above, the provider-projects in the database can also be described by a set of questions and answers and a price tag. There may be at least two different types of provider-projects 306 stored in the database. The first type can be provider-projects 306 entered by the contractors, which may be verified by administrators of the assessment tool. The second type can be provider-projects 306 that have been negotiated through administrators of the assessment tool, which may be considered as a more reliable and a fresh source of information. In some embodiments, the second type of provider-projects 306 can be the main source of provider-project 306 data.

Generating an estimate of the price for a given model project can be done by comparing at least two similar projects. This may be done in two steps. First, the questions 204 can be organized in advance manually by relevance into sets so as to have three degrees of importance. This can be, for example, by organizing the questions 204 into in three sets. Each set may have a relevance-indicator, which can be used to find the most similar projects from the database. For example, the more questions 204 with higher relevance-indicators that exist, the more similar the projects can be considered to be. Second, as the client-user begins describing a project, the assessment tool can, in real time, start generating estimates. With each question 204 answered, the system can fetch a number N of the most similar projects. A weighted average of the prices of these projects using the relevance-indicator can be used to determine the price.

Recommendations

Recommendations can also be generated in real time, which can use the same logic as the estimates. The service providers (companies or developers) may have a portfolio 304 of provider-projects 306 that they have added to the system 100, which may have been validated by administrators of the system 100 or provider-projects 306 for which they have earned and executed through the assessment tool. Each provider-project 306 can be described by a set of questions 204 and answers 202 that may define themes, and the service provider can be considered to have expertise on those questions 204 (and answers 202). A real time recommendation process may follow the steps of:

1. The client-user starts answering questions 204 about their projects.
2. The system 100 acquisitions data representing a list of service providers who have the most expertise on those themes.
3. Each service provider may be assigned an expertise-indicator 310, which can indicate to which extent the serviced provider has the skill set necessary to work on the client-user's project.

The system 100 can be programmed to present data by 3D matrix: Q&As, projects, contractors (e.g., vendors). A project can be defined by a set Q&As. A contractor can be defined by a set of projects, which implies that a contractor is in a way also a set of Q&As.

The assessment tool can be programmed to generate automatic estimates and automatic recommendations in real time for specific projects. The recommendations can be for service providers that are deemed experts in the field of the specific project defined by the client-user. The recommendations can also be for local services. Local services can be services for which a client-user may typically need a service provider to be physically present to execute the work for the project (e.g., painting, cleaning, plumbing, etc.).

In some embodiments, generating a project assessment via the assessment tool can be performed by the client-user first selecting what they need to develop e.g., a mobile app or a website. The client-user can then select from a catalogue of websites and applications. For example, the assessment tool may be programmed to present predefined packages to client-users for categories of projects (e.g., e-commerce website for a restaurant). A client-user may begin the project assessment by selecting a package from a catalogue of predefined project packages, depending on the category the client-user's project is within. A client-user may also be able to filter through the predefined project packages by category. After a client-user selects a package, the system 100 can cause the client-device to be directed to an appropriate client-questionnaire 200. The system 100 may be further programmed to prepopulate answers 202 to at least a portion of questions 204 within the client-questionnaire 200 due to the selection of the category. Historical-project data acquisitioned from the database can be used to generate estimates and recommendation specific to the category selected. For example, is the category is a website for a restaurant, then the assessment tool only perform analyses and compare historical-projects that fall within restaurant websites. This may save the client-user the trouble of answering the most common or technical questions 204. The assessment tool can be programmed to generate questions 204 to help the client-user describe what they need, and then wait for the input of the client-user. The client-user can select an answer 202 or pass on the question 204. The client-user can ask for a recommendation to select an answer 202. In some embodiments, the system 100 can simply display to the client-user the percentage of other client-users that have selected each answer 202.

In the budget panel 302, a budget estimate along with the precision of the calculation can be displayed. Generally, the more questions 204 that are answered 202, the more precise the estimate can become. The budget panel 302 can also display maximum and minimum budget recommendations. A graph with the data used to calculate the estimates can also be rendered (e.g., data pertaining to a set of similar projects to what the client-user needs).

Figure 6:
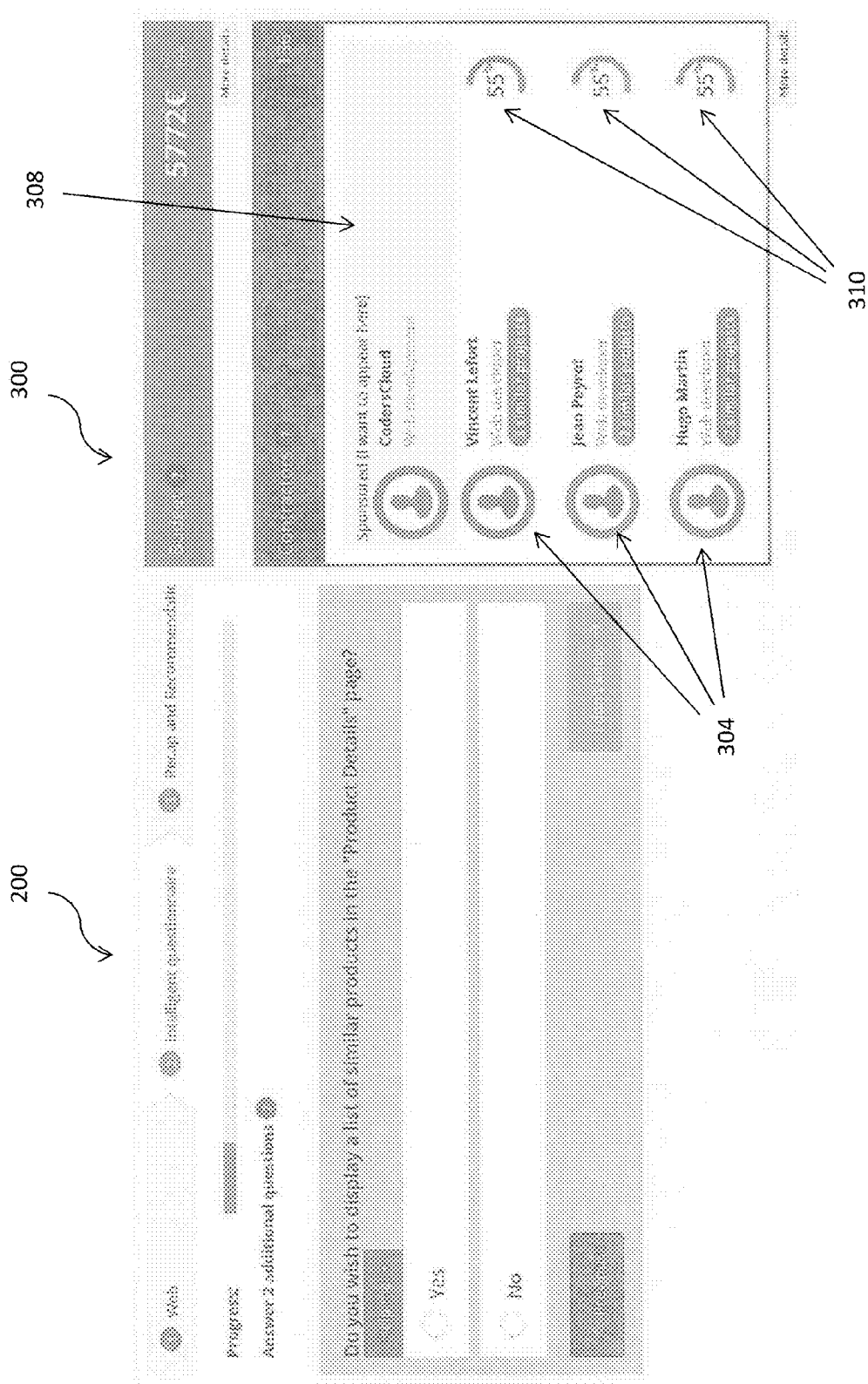
FIG. 6 is an exemplary user interface that can be displayed through a project assessment module, showing a contractor display panel.

The contractor panel 308 can display the number of contractors from the database that the assessment tool has been determined to be able to do the job, a list of the most suitable contractors (three are shown in FIG. 6), and an index (e.g., expertise-indicator) of how likely they are to do the job successfully. The number of similar projects each contractor has in their portfolio 304 can be displayed under each contractor. A client-user can click on the contractor recommendation to view the list of similar projects from that contractor's portfolio 304.

At the end of dialogue-specification phase, the user may arrive to a recap page 400 that recapitulates all the information, which can include the budget estimate and the contractor recommendations. A client-user may then be presented with a list of possible actions, which can include contacting a recommended contractor and asking for a real quote vs. the automated quote (budget estimates) generated by the assessment tool. A client-user can also post the project on a partner freelancer platform, generate a .pdf of the project assessment, save the project assessment, etc.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A method for generating a project assessment, the method comprising:
    collecting project data about a client user's project via a client-user questionnaire module displayed on a client-user computer device, wherein the collecting project data further comprises generating at least one question to receive the project data in a form of at least one answer communicated through the client-user computer device, wherein the at least one question is associated with at least one project parameter;
    generating a project assessment, via an administrator computer device, of the client's project based on the project data, wherein the generating the project assessment further comprises generating at least one relevance-indicator for the at least one question;
    acquisitioning historical-project data, via the administrator computer device from a database associated with the administrator computer device, and comparing at least one project parameter of at least one historical-project with at least one project parameter of the client user's project, wherein the acquisitioning the historical-project data from the database further comprises tagging the at least one historical-project most similar to the client user's project based upon the at least one relevance-indicator, wherein the at least one tagged historical-project is used to acquisition the at least one project parameter of the at least one historical-project most similar to the at least one project parameter of the client user's project,
    generating, via the administrator computer device, an expectation value for the at least one project parameter of the client user's project;
    generating a model project, via the administrator computer device, based on the compared project parameters of the historical-projects and the project parameters of the client user's project; and,
    displaying the model project data and the project assessment data via at least one of a project assessment module and a recapitulation and recommendations module displayed on the client-user computer device, wherein the model project data and the project assessment data comprises data representing at least one of a scope of the client user's project and an estimated cost of the client user's project.

2. The method recited in claim 1, wherein the client user's project being most similar to the at least one historical-project includes a cost and/or a budget of the client user's project being most similar to a cost and/or a budget of the at least one historical-project.

3. A method for generating a project assessment, the method comprising:
    within a computer system environment comprising at least one processor operably associated with a non-transitory memory and a database, the computer system programmed for:
        collecting project data about a client user's project via a client-user questionnaire module displayed on a client-user device, wherein the collecting project data further comprises generating at least one question to receive the project data in a form of at least one answer communicated through the client-user device, wherein at least one question is associated with at least one project parameter;
        generating a project assessment of the client's project based on the project data, wherein the generating the project assessment further comprises generating at least one relevance-indicator for the at least one question;
        acquisitioning historical-project data from the database and comparing at least one project parameter of at least one historical-project with at least one project parameter of the client user's project, wherein the acquisitioning the historical-project data from the database further comprises tagging the at least one historical-project most similar to the client user's project based upon the at least one relevance-indicator, wherein the at least one tagged historical-project is used to acquisition the at least one project parameter of the at least one historical-project most similar to the at least one project parameter of the client user's project;

generating an expectation value for the at least one project parameter of the client user's project;

generating a model project based on the compared project parameters of the historical-projects and the project parameters of the client user's project; and, displaying the model project data and the project assessment data via at least one of a project assessment module and a recapitulation and recommendations module displayed on the client-user device, wherein the model project data and the project assessment data comprises data representing at least one of a scope of the client user's project and an estimated cost of the client user's project.

4. The method recited in claim 3, wherein the at least one project parameter is a cost and/or a budget of the client user's project.

5. The method recited in claim 4, wherein the client user's project being most similar to the at least one historical-project includes the cost and/or the budget of the client user's project being most similar to the cost and/or the budget of the at least one historical-project.

6. The method recited in claim 3, further comprising displaying a measure of precision and accuracy of the data representing the scope of the client user's project and/or the estimated cost of the client user's project.

7. The method recited in claim 3, wherein:
the at least one relevance-indicator assigns a weight to the at least one project parameter of the client user's project; and,
the at least one historical-project most similar to the client user's project is tagged based on the weight the at least one relevance-indicator assigned to the at least one project parameter of the client user's project so that the at least one project parameter of the client user's project is compared to the at least one project parameter of the at least one historical-project that is most similar to it.

8. The method recited in claim 3, wherein the at least one answer is assigned an importance-indicator that is a factor of the at least one answer's impact on the at least one project parameter.

9. The method recited in claim 3, wherein the at least one question is generated dynamically based on the at least one answer received.

10. The method recited in claim 3, wherein the at least one question is generated in accordance to at least one questions tree.

11. The method recited in claim 3, further comprising collecting provider-project data about at least one contractor via a contractor-user questionnaire module displayed on a contractor-user device.

12. The method recited in claim 11, wherein the provider-project data is used in part to generate the historical-project data.

13. The method recited in claim 11, further comprising generating at least one contractor profile data for the at least one contractor, wherein the at least one contractor profile is assigned at least one expertise-indicator as a quantitative measure of expertise of the contractor.

14. The method recited in claim 13, wherein displaying the model project data and project assessment data via at least one of the project assessment module and the recapitulation and recommendations module further comprises displaying at least one of the at least one contractor profile data and the associated expertise-indicator.

15. An assessment tool for generating a project assessment, comprising:
a computer system comprising at least one processor operably associated with a non-transitory memory and a database; and,
a client-user device in operable communication with the computer system for collecting project data about a client user's project via a client-user questionnaire module displayed on the client-user device;
wherein the computer system is programmed to generate at least one question to receive the project data in a form of at least one answer communicated through the client-user device, wherein the at least one question is associated with at least one project parameter;
wherein the computer system is programmed to generate a project assessment of the client's project based on the project data, wherein the generating the project assessment further comprises generating at least one relevance-indicator for the at least one question;
wherein the computer system is programmed to acquisition historical-project data from a database of the computer system, and to compare at least one project parameter of at least one historical-project with at least one project parameter of the client's project, wherein the acquisitioning the historical-project data from the database further comprises tagging the historical-project most similar to the client user's project based upon the at least one relevance-indicator, wherein the tagged historical-project is used to acquisition the at least one project parameter of the at least one historical-project most similar to the at least one project parameter of the client user's project;
wherein the computer system is programmed to generate an expectation value for the at least one project parameter of the client user's project;
wherein the computer system is programmed to generate a model project based on the compared project parameters of the at least one historical-project and the client user's project; and,
wherein the computer system is programmed to display the model project data and the project assessment data via a project assessment module and/or a recapitulation and recommendations module displayed on the client-user device, wherein the model project data and the project assessment data comprises data representing a scope of the client user's project and/or an estimated cost of the client user's project.

16. The assessment tool recited in claim 15, wherein the at least one project parameter is a cost and/or a budget of the client user's project.

17. The assessment tool recited in claim 15, wherein the historical-project data further comprises provider-project data about at least one contractor that has been entered via a contractor-user questionnaire module displayed on a contractor-user device.

18. The assessment tool recited in claim 16, wherein the client user's project being most similar to the at least one historical-project includes the cost and/or a budget of the client user's project being most similar to the cost and/or the budget of the at least one historical-project.

19. The assessment tool recited in claim 15, wherein the computer system is further programmed to assign at least one importance-indicator to the at least one answer that is a factor of the at least one answer's impact on the at least one project parameter.

20. The assessment tool recited in claim 15, wherein the computer system is further programmed to generate contractor profile data for a at least one contractor stored in the database, generating at least one contractor profile, wherein the at least one contractor profile is assigned at least one expertise-indicator as a quantitative measure of expertise of the at least one contractor.

* * * * *